United States Patent
Gleichauf et al.

(10) Patent No.: US 6,324,656 B1
(45) Date of Patent: *Nov. 27, 2001

(54) SYSTEM AND METHOD FOR RULES-DRIVEN MULTI-PHASE NETWORK VULNERABILITY ASSESSMENT

(75) Inventors: Robert Gleichauf; Steven Shanklin; Scott Waddell, all of San Antonio; Kevin Ziese, Converse, all of TX (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,964

(22) Filed: Jun. 30, 1998

(51) Int. Cl.[7] .................................................. G06F 11/00
(52) U.S. Cl. ............................................. 714/37; 713/201
(58) Field of Search .................................. 714/37, 38, 39, 714/47, 32; 713/200, 201, 202; 380/4, 23, 25, 49

(56) References Cited

U.S. PATENT DOCUMENTS

| | | | |
|---|---|---|---|
| 4,956,769 | * 9/1990 | Smith | 364/200 |
| 5,032,979 | 7/1991 | Hecht et al. | 364/200 |
| 5,101,402 | 3/1992 | Chiu et al. | 370/17 |
| 5,278,901 | 1/1994 | Shieh et al. | 380/4 |
| 5,414,833 | 5/1995 | Hershey et al. | 395/575 |
| 5,448,724 | 9/1995 | Hayashi | 395/182.02 |
| 5,488,715 | 1/1996 | Wainwright | 395/182.02 |
| 5,524,238 | 6/1996 | Miller et al. | 395/600 |
| 5,557,742 | * 9/1996 | Smaha et al. | 395/186 |
| 5,606,668 | * 2/1997 | Shwed | 395/200.11 |
| 5,621,889 | 4/1997 | Lermuzeaux et al. | 395/186 |
| 5,699,513 | 12/1997 | Feigen et al. | 395/187.01 |
| 5,727,061 | * 3/1998 | Johnson et al. | 380/25 |
| 5,727,146 | * 3/1998 | Savoldi et al. | 395/187.01 |
| 5,793,763 | 8/1998 | Mayes et al. | 370/389 |
| 5,796,942 | 8/1998 | Esbensen | 395/187.01 |
| 5,798,706 | 8/1998 | Kraemer et al. | 340/825.07 |
| 5,805,801 | 9/1998 | Holloway et al. | 395/187.01 |
| 5,826,014 | 10/1998 | Coley et al. | 395/187.01 |
| 5,892,903 | * 4/1999 | Klaus | 395/187.01 |
| 5,903,882 | * 5/1999 | Asay et al. | 705/44 |
| 5,919,257 | 7/1999 | Trostle | 713/200 |
| 5,925,126 | * 7/1999 | Hsieh | 713/200 |
| 5,926,463 | * 7/1999 | Ahearn et al. | 370/254 |
| 5,931,946 | 8/1999 | Terada et al. | 713/201 |
| 5,991,881 | 11/1999 | Conklin et al. | 713/201 |

OTHER PUBLICATIONS

"Preliminary Report on Advanced Security Audit Trail Analysis on UNIX," N. Habra et al., pp. 1–34 (found at http://www.cs.purdue.edu/coast/archive/data/categ24.html), Sep. 1994.

"IDIOT–Users Guide," M. Crosbie, et al., pp. 1–63, (found at http://www.cs.purdue.edu/coast/archive/data/categ24.html), Sep. 1996.

"An Introduction to Intrusion Detection," A. Sundaram, pp. 1–10, (found at http://www.cs.purdue.edu/coast/archive/data/categ24.html).

(List continued on next page.)

Primary Examiner—Nadeem Iqbal
(74) Attorney, Agent, or Firm—Baker Botts L.L.P.

(57) ABSTRACT

In one aspect of the invention, a computer implemented method for rules-driven multi-phase network vulnerability assessment is disclosed. The method comprises pinging devices on a network to discover devices with a connection to the network. Port scans are performed on the discovered devices and banners are collected. Information from the collected banners are stored as entries in a first database. Analysis is performed on the entries by comparing the entries with a rule set to determine potential vulnerabilities. The results of the analysis are stored in a second database.

27 Claims, 5 Drawing Sheets

OTHER PUBLICATIONS

"Use of A Taxonomy of Security Faults," T. Aslam, et al., pp. 1–10, (found at http://www.cs.purdue.edu/coast/archive/data/categ24.html), Sep. 1996.

"Artificial Intelligence and Intrusion Detection: Current and Future Directions," Jeremy Frank, pp. 1–12, (found at http://www.cs.purdue.edu/coast/archive/data/categ24.html), Jun. 1994.

"ASAX Conceptual Overview," ASAX Brochure, A. Mounji, (found at http://www.cs.purdue.edu/coast/archive/data/categ24.html).

"GrIDS–A Graph Based Intrusion Detection System For Large Networks," S. Staniford–Chen, et al., 10 pages, (found at http://www.cs.purdue.edu/coast/archive/data/categ24.html).

"A Pattern Matching Model For Misuse Intrusion Detection," S. Kumar, et al., pp. 1–11, (found at http://www.cs.purdue.edu/coast/archive/data/categ24.html).

"An Application of Pattern Matching in Intrusion Detection", S. Kumar, et al., pp. 1–55, (found at http://www.cs.purdue.edu/coast/archive/data/categ24.html), Jun. 1994.

"A Software Architecture to Support Misuse Intrusion Detection", S. Kumar, et al., pp. 1–17, (found at http://www.cs.purdue.edu/coast/archive/data/categ24.html), Mar. 1995.

"Applying Genetic Programming to Intrusion Detection", M. Crosbie, et al., pp. 1–8, (found at http://www.cs.purdue.edu/coast/archive/data/categ24.html).

"Defending a Computer System Using Autonomous Agents", M. Crosbie, et al., pp. 1–11, (found at http://www.cs.purdue.edu/coast/archive/data/categ24.html), Mar. 1994.

"Analysis Of An Algorithm For Distributed Recognition And Accountability", C. Ko, et al., pp. 1–11, (found at http://www.cs.purdue.edu/coast/archive/data/categ24.html).

"A Standard Audit Trail Format", Matt Bishop, 10 pages, (found at http://www.cs.purdue.edu/coast/archive/data/categ24.html).

Master Thesis entitled USTAT A Real–time Intrusion Detection System for UNIX, University of California, K. Ilgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/cageg30.html), Feb. 1985.

"The Architecture and Implementation of Network–Layer Security Under Unix", J. Ioannidis, et al., 11 pages, (found at http://www.cs.purdue.edu/coast/archive/data/categ30.html).

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/categ30.html), Sep. 1992.

"Paving The Road To Network Security Or The Value Of Small Cobblestones", H. Orman, et al., pp. 1–17, (found at http://www.cs.purdue.edu/coast/archive/data/categ30.html), May 1994.

"Packets Found on an Internet", S. Bellovin, pp. 1–6, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48) pp. 1–17, Apr. 1989.

"A Security Analysis of the NTP Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A. Curry, et al., pp. 1–9, (found at http://www.cs.purdue.edu/coast/archive/data/categ30.html), Oct. 1990.

"NFS Tracing By Passive Network Monitoring", Matt Blaze, 11 pages, (found at http://www.cs.purdue.edu/coast/archive/data/categ30.html).

"Pseudo–Network Drivers and Virtual Networks", S.M. Bellovin, 15 pages, (found at http://www.cs.purdue.edu/coast/archive/data/categ30.html).

Masters Thesis entitled "Addressing Weaknesses In The Domain Name System Protocol", Purdue University, Christoph Schuba, pp. 1–87., (found at http://www.cs.purdue.edu/coast/archive/data/categ30.html), Aug. 1993.

"Countering Abuse of Name–Based Authentication", C.L. Schuba, et al., pp. 1–21., (found at http://www.cs.purdue.edu/coast/archive/data/categ30.html).

"The 'Session Tty' Manager", S.M. Bellovin, pp. 1–16., (found at http://www.cs.purdue.edu/coast/archive/data/categ30.html).

"Secure RPC Authentication (SRA) for TELNET and FTP", D.R. Safford, et al., pp. 1–5, (found at http://www.cs.purdue.edu/coast/archive/data/categ30.html), 1993.

"A Reliable and Secure UNIX Connection Service", D. Draheim, et al., pp. 1–12, (found at http://www.cs.purdue.edu/coast/archive/data/categ30.html).

"TCP Wrapper Network Monitoring, Access Control, and Booby Traps", Wietse Venema, 8 pages., (found at http://www.cs.purdue.edu/coast/archive/data/categ30.html).

"Characteristics of Wide–Area TCP/IP Conversations", R. Céceres, et al., pp. 1–12, (found at http://www.cs.purdue.edu/coast/archive/data/categ30.html).

"A Unix Network Protocol Security Study: Network Information Service", D.K. Hess, et al., 5 pages, (found at http://www.cs.purdue.edu/coast/archive/data/categ30.html).

"Insertion, Evasion, and Denial of Service: Eluding Network Intrusion Detection", T.H. Ptacek et al., pp. 1–63, Jan. 1998.

"A Method to Detect Intrusive Activity in a Networked Environment", L.T. Heberlein et al., *Proc. of the 14th National Computer Security Conference*, Oct. 1991, pp. 362–371., (found at http://seclab.cs.ucdavis.edu/papers.html.).

"Internetwork Security Monitor: An Intrusion–Detection System for Large–Scale Networks", L.T. Heberlein et al., *Proc. of the 15th National Computer Security Conference*, Oct. 1992, pp. 262–271.

"Comparison Between Internet Security Scanner (ISS) 1.x and Internet Scanner 3.2", by Internet Security Systems., (found at http://www.iss.net), 1996.

"Automated Tools for Testing Computer System Vulnerability", W.T. Polk, 40 pages, Dec. 1992.

The Design of GrIDS: A Graph–Based Intrusion Detection System, S. Cheung et al., *U.C. Davis Computer Science Department Techical Report SCE–99–2*, 1999, pp. 1–47, (found at http://seclab.cs.ucdavis.edu/papers.html.).

"Luby–Rackoff Backwards: Increasing Security by Making Block Ciphers Non–Invertible", M. Bellare, et al., *Advances in Cryptology–Eurocrypt 98 Proceedings, Lecture Notes in Computer Science*, vol. 1403 Springer–Verlat (1998) pp. 1–27, (found at http://seclab.cs.ucdavis.edu/papers.html.).

"Detecting Disruptive Routers: A Distributed Network Monitoring Approach", K.A. Bradley, et al., *Proceedings of the 1998 IEEE Symposium on Security and Privacy*, Oakland, CA, pp. 115–124 (found at http://seclab.cs.ucdavis.edu/papers.html.).

"Stack and Queue Integrity on Hostile Platforms", P.T. Devanbu, et al., *IEEE Symposium on Security and Privacy*, Oakland CA, (found at http://seclab.cs.ucdavis.edu/papers.html.), 1998.

"Techniques for Trusted Software Engineering", P.T. Devanbu et al., *Proceedings of the 20th International Conference on Software Engineering*, Kyoto, Japan, (found at http://seclab.cs.ucdavis.edu/papers.html.), 1998.

"Data Level Inference Detection in Database Systems", R.W. Yip et al., *Proceedings of the 11th IEEE Computer Security Foundations Workshop*, Rockport, Massachusetts, (found at http://seclab.cs.ucdavis.edu/papers.html.), 1998.

"The Design and Implementation of a Data Level Database Inference Detection System",.Yip et al., *Proceedings of the Twelfth Annual IFIP WG 11.3 Working Conference on Database Security*, Chalkidiki, Greece 14 pages, (found at http://seclab.cs.ucdavis.edu/papers.html.), 1998.

"Theft of Information in the Take–Grant Protection Model", Matt Bishop, 35 pages, *Journal of Computer Security* 4(4)(1996), (found at http://seclab.cs.ucdavis.edu/papers.html.).

"Information Survivability, Security, and Fault Tolerance", Matt Bishop, position paper for the Information Survivability Workshop *Journal of Computer Security #6*) 1 page, (found at http://seclab.cs.ucdavis.edu/papers.html), 1997.

"Teaching Computer Security", Matt Bishop, position paper for the *Workshop on Education in Computer Security*, Monterey CA, 3 pages, (found at http://seclab.cs.ucdavis.edu/papers.html.), 1997.

"Protecting Routing Infrastructures from Denial of Service Using Cooperative Intrusion Detection", S. Cheung et al., *Proc. New Security Paradigms Workshop*, Cumbria, UK 13 pages, (found at http://seclab.cs.ucdavis.edu/papers.html.), 1997.

"An Efficient Message Authentication Scheme for Link State Routing", S. Cheung, *Proc. 13th annual Computer Security Applications Conference*, San Diego, CA, 9 pages, (found at http://seclab.cs.ucdavis.edu/papers.html.), 1997.

"Cryptographic Verfication of Test Coverage Claims", P. Devanbu et al., *Proceedings, Fifth ACM/SIGSOFT Conference on Foundations of Software Engineering* Zurich, Switzerland) found at http://seclab.cs.ucdavis.edu/papers.html.), 1997.

"Property–Based Testing; A New Approach to Testing for Assurance", Fink et al., *ACM SIGSOFT Software Engineering Notes*, 22(4), (found at http://seclab.cs.ucdavis.edu/papers.html.), 1997.

"Checking for Race Conditions in File Accesses", Bishop et al., *Computing Systems* 9(2)., (found at http://seclab.cs.ucdavis.edu/papers.html.), 1996.

"An Isolated Network for Research", Bishop et al., *The 19th NISSC*, pp. 1–9, (found at http://seclab.cs.ucdavis.edu/papers.html.), 1996.

"Goal–Oriented Auditing and Logging", Bishop et al., submitted to IEEE Transactions on Computing Systems, (found at http://seclab.cs.ucdavis.edu/papers.html.), 1996.

"Extending The Take–Grant Protection System", J. Frank et al., The IEEE Oakland Conference on Research in Security and Privacy., (found at http://seclab.cs.ucdavis.edu/papers.html.), Dec. 5, 1996.

Network Security Via Reverse Engineering to TCP Code: Vulnerability Analysis and Proposed Solutions, Guha et al., *Proc. of the IEEE Infocom '96*, San Francisco, CA (found at http://seclab.cs.ucdavis.edu/papers.html.).

"Attack Class: Address Spoofing", Heberlein et al., The 19th National Information Systems Security Conference, (found at http://seclab.cs.ucdavis.edu/papers.html), 1996.

PhD. Theses entitled Execution Monitoring Of Security––Critical Programs In A Distributed System: A Specification–Based Approach, Calvin Cheuk Wang Ko, 111 pages, (found at http://seclab.cs.ucdavis.edu/papers.html), 1996.

"A Methodology for Testing Intrusion Detection Systems", Puketza et al., *IEEE Transactions on Software Engineering*, vol. 22, No. 10, (found at http://seclab.cs.ucdavis.edu/papers.html), 1996.

"The Exact Security of Digital Signatures–How to Sign with RSA and Rabin", Bellare et al. Earlier version appears in *Advances in Cryptology—Eurocrypt '96*, LNCS vol. 1070, U. Maurer ed., Springer–Verlag, pp. 399–416), (found at http://seclab.cs.ucdavis.edu/papers.html).

"How to Protect DES Against Exhaustive Key Search", Kilian et al., Advances in Cryptology—CRYPTO '96., (found at http://seclab.cs.ucdavis.edu/papers.html).

"GrIDS–A Graph Based Intrusion Detection System For Large Networks", Staniford–Chen et al., *The 19th NISSC*. 10 pages, (found at http://seclab.cs.ucdavis.edu/papers.html), 1996.

"NetKuang–A Multi–Host Configuration Vulnerability Checker", Zerkle et al., *Proc. of the 6th USENIX Security Symposium*, San Jose, CA., (found at http://seclab.cs.ucdavis.edu/papers.html), 1996.

"A Standard Audit Trail Format", Matt Bishop, *Proc. of the 1995 NISSC*, Baltimore, MD., (found at http://seclab.cs.ucdavis.edu/papers.html).

Abstract entitled Theft of Information in the Take–Grant Protection Model, Matt Bishop, *Journal of Computer Security*, vol. 3, No. 4, (found at http://seclab.cs.ucdavis.edu/papers.html), 1995.

"Improving System Security via Proactive Password Checking", Matt Bishop, *Computers & Security*, vol. 14, No. 3, pp. 233–249, (found at http://seclab.cs.ucdavis.edu/papers.html), 1995.

"Simulating Concurrent Intrusions for Testing Intrusion Detection Systems: Parallelizing Intrustions", Chung et al., *Proc. of the 1995 NISSC*, Baltimore, MD, 11 pages, (found at http://seclab.cs.ucdavis.edu/papers.html).

"Network Security Monitor", L. Todd Heberlein, *Lawrence Livermore National Laboratory project deliverable*, (found at http://seclab.cs.ucdavis.edu/papers.html), 1995.

"Audit Log Analysis Using the Visual Audit Browser Toolkit", Hoagland et al., *U.C. Davis Computer Science Department Technical Report CSE–95–11*, (found at http://seclab.cs.ucdavis.edu/papers.html), 1995.

"MCF: A Malicious Code Filter", R.W. Lo et al., *Computers & Security*, (1995) vol. 14, No. 6. (27 pages.), (found at http://seclab.cs.ucdavis.edu/papers.html).

"Bucket Hashing and its Application to Fast Message Authentication", Phillip Rogaway, *Acvances in Cryptology—CRYPTO '95*, (found at http://seclab.cs.ucdavis.edu.papers.html).

"Provably Secure Session Key Distrubition–The Three Party Case", Bellare et al., *Proc. of the 27th Annual ACM Symposium on Theory of Computing*, Las Vegas, NV, (found at http://seclab.cs.ucdavis.edu/papers.html), 1995.

"XOR MACs: New Methods for Message Authentication Using Finite Pseudorandom Functions", Bellare et al.,*Advances in Cryptology—CRYPTO '95*, (found at http://seclab.cs.ucdavis.edu/papers.html).

"Holding Intruders Accountable on the Internet", Staniford–Chen et al., *Proc. of the 1995 IEEE Symposium on Security and Privacy*, Oakland, CA, (11 pages) (found at http://seclab.cs.ucdavis.edu/papers.html).

"LAFS: A Logging and Auditing File System", Christopher Wee, *Proc. of the 11th Computer Security Applications Conference*, 10 pages, (found at http://seclab.cs.ucdavis.edu/papers.html), 1995.

"Towards a Property–based Testing Environment with Applications to Security–Critical Software", Fink et al., *Proc. of the 4th irvine Software Symposium*. 10 pages, (found at http://seclab.cs.ucdavis.edu/papers.html), 1994.

"Property–based Testing of Privileged Programs", Fink et al., *Proc. of the 10th Annual Computer Security Applications Conference*, Orlando, FL. 10 pages, (found at http://seclab.cs.ucdavis.edu/papers.html), Dec. 1994.

"Arificial Intelligence and Intrusion Detection: Current and Future Directions", Jeremy Frank,*Proc. of the 17th National Computer Security Conference*. 12 pages, (found at http://seclab.cs.ucdavis.edu/papers.html), 1994.

"Automated Detection of Vulnerabilities in Privileged Programs by Execution Monitoring", Ko et al.,*Proc. of the 10th Annual Computer Security Applications Conference*, Orlando, FL. (found at http://seclab.cs.ucdavis.edu/papers.html), 1994.

"Common Techniques in Fault–Tolerance and Security", Levitt et al., *Proc. of the Dependable Computing for Critical Applications 4*, San Diego, CA. 4 pages, (found at http://seclab.cs.ucdavis.edu/papers.html), 1994.

"Network Intrustion Detection", Mukherjee et al., *IEEE Network*, May–Jun. 1994, vol. 8, No. 3, pp. 26–41. (found at http://seclab.cs.ucdavis.edu/papers.html).

"A New Suggestion for How to Encrypt with RSA", Bellare et al., *Eurocrypt '94*, 20 pages, (found at http://seclab.cs.ucdavis.edu/papers.html).

"The Security of Cipher Block Chaining", Bellare et al., *Advances in Cryptology—CRYPTO '94*, Santa Barbara CA. (19 pages.) (found at http://seclab.cs.ucdavis.edu/papers.html).

"Analysis Of An Algorithm For Distributed Recognition And Accountability", Ko et al., *Proc. 1st ACM Conference or Computer and Communication Security*. Fairfax, VA, Nov. 1993, 11 pages, (found at http://seclab.cs.ucdavis.edu/papers.html).

"Entity Authentication and Key Distribution". Bellare et al., *Advances in Cryptology—CRYPTO '93*, Santa Barbara, CA, Aug. 1993, pp. 232–249. (found at http://seclab.cs.ucdavis.edu/papers.html).

"Random Oracles are Practical: A Paradigm for Designing Efficient Protocols", Bellare et al., *Proc. of the 1st ACM Conference on Computer and Communication Security*, Fairfax, VA, Nov. 1993, pp. 1545–164. (found at http://seclab.cs.ucdavis.edu/papers.html).

"A Software–Optimized Encryption Algorithm", Rogaway et al., *Proc. of the Fast Software Encryption Cambridge Security Workshop*, Cambridge, UK (16 pages.) (found at http://seclab.cs.ucdavis.edu/papers.html), 1993.

"Anatomy of a Proactive Password Changer", Matt Bishop, *Proc. of the UNIX Security Symposium III* Baltimore, MD, 15 pages. (found at http://seclab.cs.ucdavis.edu/papers.html), 1992.

DIDS (Distributed Intrusion Detection System)– Motivation, Architecture, and An Early Prototype, Snapp et al., *Proc. 14th National Computer Security Conference*, Washington, DC (9 pages.) (found at http://seclab.cs.ucdavis.edu/papers.html), 1991.

"Proactive Password Checking", Matt Bishop, *Proc. of the 7th International Conference on Information Security*, May 1991, pp. 169–181. (found at http://seclab.cs.ucdavis.edu/papers.html).

Dissertation entitled Issues in Debugging Sequential and Concurrent Programs: Methods, Techniques, and Implementation, University of California, Wingshun Wilson Ho, 191 pages. (found at http://seclab.cs.ucdavis.edu/papers.html), 1992.

Abstract entitled "Collaboration Using Roles" by M. Bishop, *Software—Practice and Experience*, vol. 20, No. 5, May 1990. (found at http://seclab.cs.ucdavis.edu/papers.html).

Abstract entitled "An Extendable Password Checker" by M. Bishop, *Proc. UNIX Security II* Portland, OR, Aug. 27–28, 1990, pp. 15–16, (found at http://seclab.cs.ucdavis.edu/papers.html).

Abstract entitled "A Security Analysis of the NTP Protocol Version 2" by M. Bishop, Dec. 1990.

Abstract entitled "A Little Knowledge Goes a Long Way: Faster Detection of Comprised Data in 2–D Tables" by D. Gusfield, *Proc. of the 1990 IEEE Symposium on Research in Security and Privacy*, Oakland, CA, May 7–9, 1990, pp. 86–94, (found at http://seclab.cs.ucdavis.edu/papers.html).

Abstract entitled "A Network Security Monitor" by L.T. Heberlein, G.V. Dias, K.N. Levitt, B. Mukherjee, and others, *Proc. of the 1990 IEE Symposium on Research in Security and Privacy*, Oakland, CA, May 7–9, 1990, pp. 296–304, (found at http://seclab.cs.ucdavis.edu/papers.html).

Abstract entitled "Static Analysis Virus Detection Tools for UNIX Systems" by P. Kerchen, et al., *Proc. 13th National Computer Security Conference*, Washington, DC, Oct. 1–4, 1990, pp. 350–365, (found at http://seclab.cs.ucdavis.edu/papers.html).

Abstract entitled "Security with Low Communication Overhead" by D. Beaver, et al., *Proc. Advances in Cryptology-CRYPTO '90*, Santa Barbara, CA, Aug. 11–15, 1990, pp. 62–76, (found at http://seclab.cs.ucdavis.edu/papers.html).

Abstract entitled "The Round Complexity of Secure Protocols" by D. Beaver, et al., *Proc. of the 22nd Annual ACM Symposium on Theory of Computing*, Baltimore, MD, May 14–16, 1990, pp. 503–513. (found at http://seclab.cs.ucdavis.edu/papers.html).

Abstract entitled "PACLs: An Access Control List Approach to Anti–Viral Security" by D.R. Wichers, et al., *Proc. 13th National Computer Security Conference*, Washington, DC, Oct. 1–4, 1990, pp. 340–349. (found at http://seclab.cs.ucdavis.edu/papers.html).

Abstract entitled "Verification of Secure Distributed Systems in Higher Order Logic: A Modular Approach Using Generic Components" by J. Alves–Foss, K. Levitt, *Proc. of the 1991 IEEE Computer Society Symposium on Research in Security and Privacy*, Oakland CA May 20–22, 1991, pp. 122–135. (found at http://seclab.cs.ucdavis.edu/papers.html).

Abstract entitled "An Authentication Mechanism for USENET" by M. Bishop, *Proc. of the Winter 1991 USENIX Conference*. Jan. 21–25, 1991, pp. 281–287, (found at http://seclab.cs.ucdavis.edu/papers.html).

Abstract entitled "Password Management" by M. Bishop, *Compcon Spring '91. Digest of Papers*. San Francisco, CA, Feb. 25–Mar. 1, 1991, pp. 167–169. (found at http://seclab.cs.ucdavis.edu/papers.html).

Abstract entitled "Teaching Computer Security" by M. Bishop, May 1993.

Abstract entitled "Recent Changes to Privacy Enhanced Electronic Mail" by M. Bishop, *Journal of Internetworking: Research and Experience*. vol. 4, No. 1, Mar. 1993, pp. 47–59. (found at http://seclab.cs.ucdavis.edu/papers.html).

Abstract entitled "A Modified Random Perturbation Method for Database Security" by P. Tendick, N. Matloff, *ACM Transactions on Database Systems*, Mar. 1994, vol. 19, No. 1, pp. 47–63, (found at http://seclab.cs.ucdavis.edu/papers.html).

Short presentation entitled "Intrusion Detection for network Infrastructures" by S. Cheung, K.N. Levitt, C. Ko. *The 1995 IEEE Symposium on Security and Privacy*, Oakland CA, May 1995.

Master Thesis entitled "Paradigms for the Reduction of Audit Trails" by B. Wetmore, pp. i–6. Unable to obtain entire thesis—portion downloaded from http://seclab.cs.ucdavis.edu/papers.html, 1993.

"Open System Security—an Architectural Framework" by Arto T. Karila, (found at http://www/cs.purdue.edu/coast/archive/data/categ.30.html), Jun. 1991.

Product description for "Oil Change" located on the Internet at http://store.mcafee.com/product.asp?ProductID=28&CategoryID–12, pp. 1–2.

NetRanger 1.3 User's Guide, Copyright © 1997 by WheelGroup Corporation, NetRanger product first available summer of 1996.

"Information Security and Privacy in Network Environments," U.S. Office of Technology Assessment, OTA–TCT–606 (Washington DC: US Government Printing Office), Sep. 1994.

"A Few Attacks on the Zero Knowledge State in Novell's Netware" by Greg Miller, pp. 1–11. (found at http://www.cs.purdue.edu/coast/archive/data/categ30.html), Jul. 30, 1996.

"Introduction to Algorithms," by Thomas H. Cormen, Charles E. Leiserson, Ronald L. Rivest, Chap. 34, pp. 853–885, Copyright © 1990.

* cited by examiner

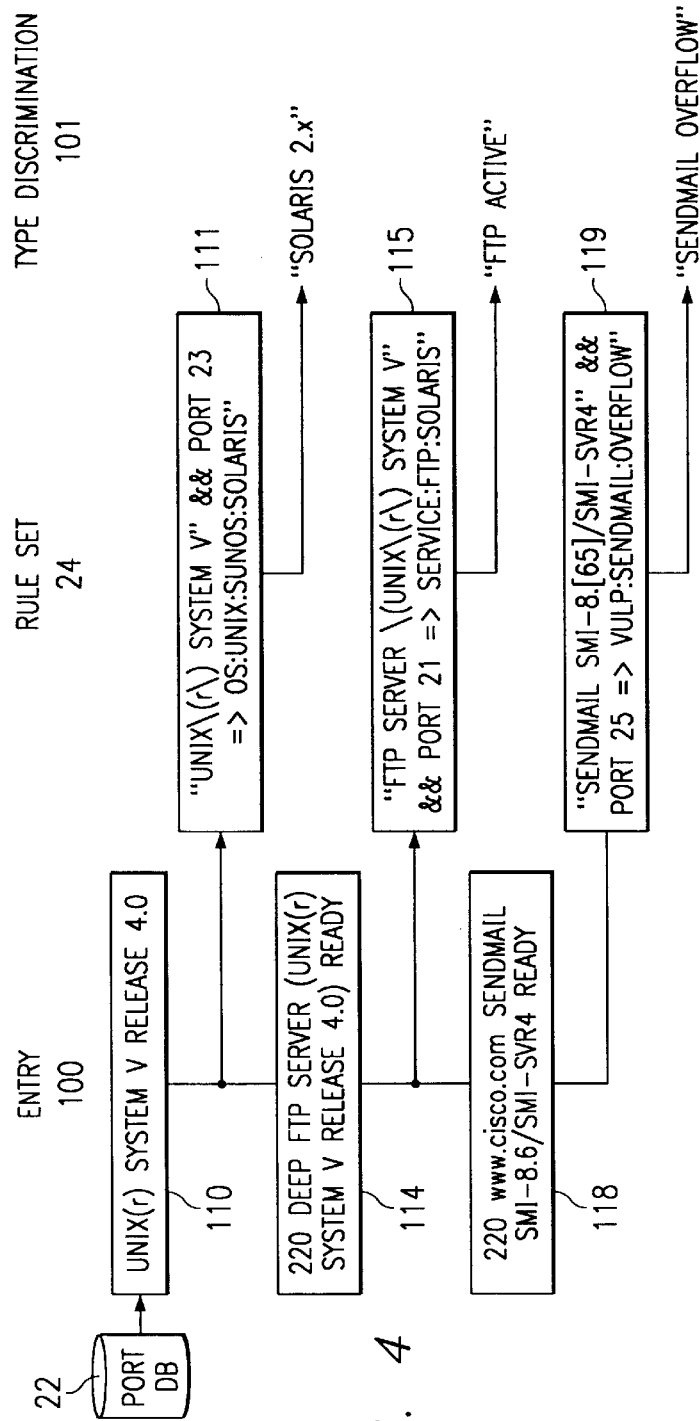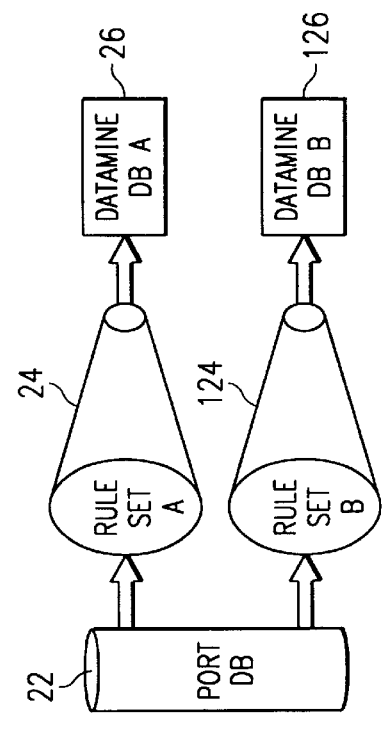
FIG. 4
FIG. 5

SYSTEM AND METHOD FOR RULES-DRIVEN MULTI-PHASE NETWORK VULNERABILITY ASSESSMENT

TECHNICAL FIELD OF THE INVENTION

The present invention relates in general to network vulnerability assessment and, more particularly, to a system and method for rules-driven multi-phase network vulnerability assessment.

BACKGROUND OF THE INVENTION

Network vulnerability assessment involves the detection of potential unauthorized uses and associated exploits (collectively "vulnerabilities") as they relate to computer networks, the devices that connect to such networks, and/or the subsystems that make up those devices. Network types can include, for example, the Internet, FDDI, token ring, etc. Devices can include routers, switches, workstations, personal computers, printers, and other devices. Subsystems can include, for example, hardware types, operating systems, application programs, etc.

Network vulnerability assessment can be highly complex because the vulnerabilities in a given network can depend upon the version and configuration of the network and upon the devices and subsystems coupled to the network. Additionally, networks can possess atomic as well as composite vulnerabilities. An atomic vulnerability can be a particular application running on a specific device port, for example SMTP. A composite vulnerability can result, among other reasons, because of the combination of two particular subsystems. For example, an operating system, such as WINDOWS NT 3.5, with a collection of certain subordinate applications can present composite vulnerabilities.

Another difficulty for vulnerability assessment stems from the highly dynamic nature of network environments. Devices of known or unknown type can be added and removed from the network at any time. Additionally, different versions and types of subsystems can be introduced to the network. Each change or upgrade includes the potential for new or changed vulnerabilities to exist on that network.

There are a number of conventional systems that attempt to assess the vulnerability of computer systems but are deficient for a variety of reasons. For example, Computer Oracle and Password System (COPS) is designed to probe for vulnerabilities on a host system. However, COPS does not maintain information across an entire network and can predict vulnerabilities only on a single host. Other conventional systems include System Administrator Tool for Analyzing Networks (SATAN Suite) and Internet Security Scanner (ISS). These products can scan computer systems for vulnerabilities by active probing, analyze the collected data for vulnerabilities, and display the results. However, several disadvantages are associated with these products. For example, data collection and analysis are implemented as a single process. Such a methodology creates a prohibitively time consuming process. Furthermore, as new vulnerabilities are discovered or a network is changed, it is not possible to recreate a previous network configuration in order to test for the newly-discovered potential vulnerabilities.

Additional problems with conventional systems include the fact that the analysis process can take a prohibitive amount of computing power as the network grows; as such, potential vulnerabilities can be missed. A further problem is that such conventional systems scan for live Internet Protocol (IP) addresses on a network; therefore, vulnerabilities that exist on services that are not active during a scan can be missed.

SUMMARY OF THE INVENTION

In accordance with the present invention, a system and method for rules-driven multi-phase network vulnerability assessment are disclosed that provide significant advantages over prior developed systems.

According to one aspect of the present invention, a method for network vulnerability assessment includes pinging devices on a network to discover devices with a connection to the network. Port scans are then performed on the discovered devices, and banners are collected as a result of the port scans. Information from the collected banners is stored as entries in a first database. Analysis is performed on the entries in the first database by comparing the entries with a rule set to determine potential vulnerabilities. The results of the analysis are then stored in a second database.

In one embodiment, the method for network vulnerability assessment also includes performing host nudges on the devices and storing information from data received as entries in the first database. In another embodiment, the method can include performing active data collection on the devices.

In a further embodiment, the method for network vulnerability assessment can include comparing an entry to a rule to determine an operating system represented by the entry. The entry and the operating system can then be compared to a second rule to determine a service. The entry and the service can be compared to a third rule to determine a potential vulnerability.

According to another aspect of the present invention, a system is provided for network vulnerability assessment. The system includes an execution module operable to ping devices on a network to discover devices with a connection to the network. The execution module is further operable to perform port scans on the discovered devices and collect banners sent as a result of the port scans. The execution module is coupled to a first database and is operable to store information from the collected banners as entries in the first database. The execution module is also coupled to a rule set and is operable to perform analysis of the entries in the first database by comparing the entries with the rule set to determine potential vulnerabilities. The execution module is coupled to a second database for storing results of the analysis.

It is a technical advantage of the present invention that the dimensionality of a network can be deduced from the perspective of its core attributes, such as device types, operating systems, services, and potential vulnerabilities.

It is another technical advantage that a network configuration, once discovered, can be retained as a snapshot such that multiple rule sets can be run against that single configuration.

It is a further technical advantage of the present invention that each host potentially connected to the network can be identified, and the appropriate vulnerabilities can be assessed.

It is also a technical advantage that, once identified, potential vulnerabilities can be confirmed.

It is another technical advantage of the present invention that the rule set can be implemented with an ASCII based prepositional logic system which allows ease of modification and extension.

Other technical advantages should be apparent to one of ordinary skill in the art in view of the specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 4 is a flow diagram of a portion of one embodiment of a prepositional logic rule set used network vulnerability assessment according to the present invention; and FIG. 5 is a block diagram of one embodiment of an analysis phase of one embodiment of a method for network vulnerability assessment according to the present invention.

DETAILED DESCRIPTION OF THE INVENTION

Figure 1:
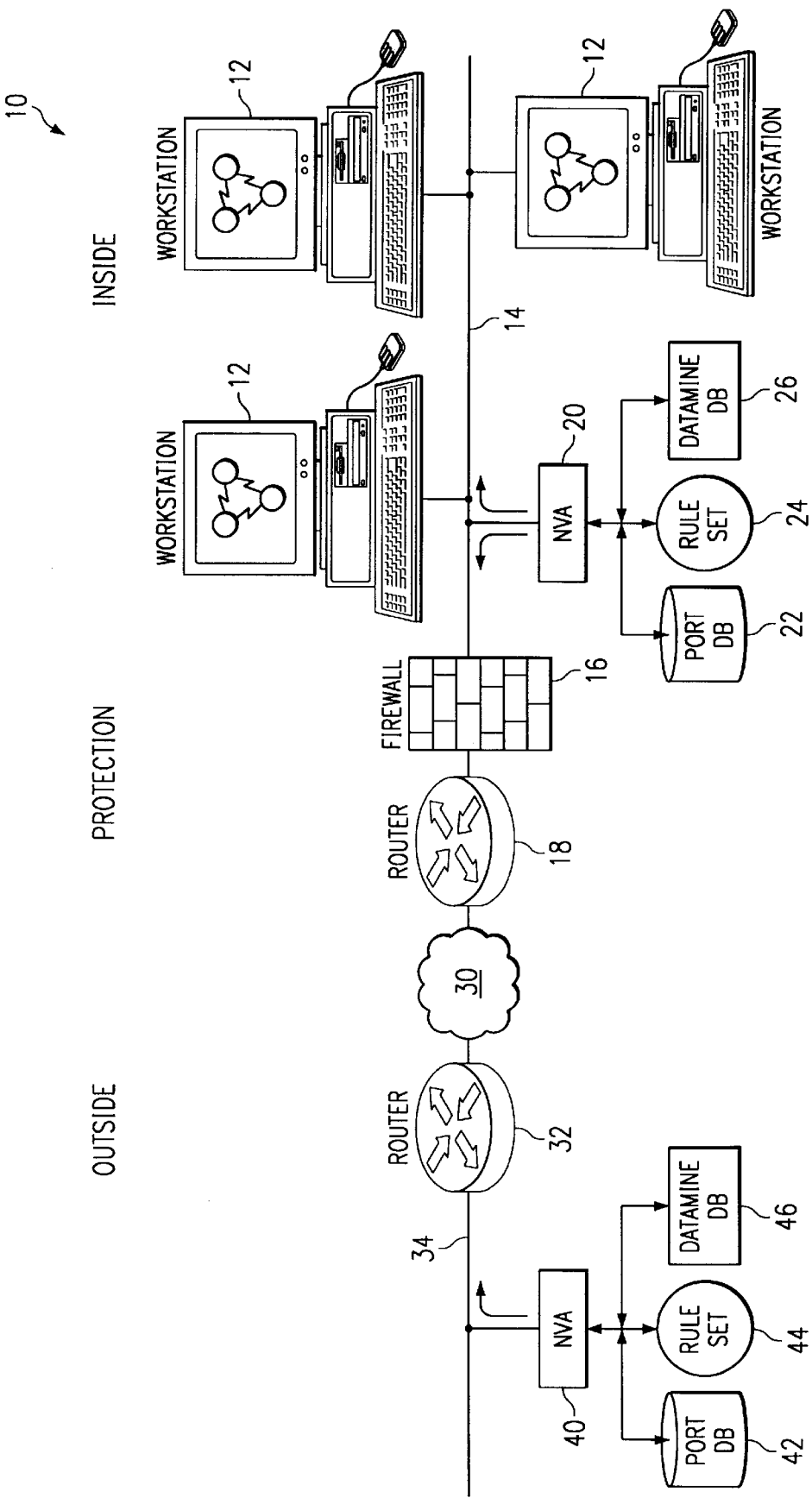
FIG. 1 is a block diagram of one embodiment of a network environment that includes a system for network vulnerability assessment according to the present invention.

FIG. 1 is a block diagram of one embodiment of a network environment that includes of a system for network vulnerability assessment according to the present invention. As shown, the network environment can comprise devices that form an internal network, protection for the internal network, and an external network.

The internal network, indicated generally at 10, can comprise a plurality of workstations 12 coupled to a network backbone 14. Network backbone 14 can comprise, for example, an intranet, FDDI, token ring, or other type of network backbone. Protection for internal network 10 can be provided by a firewall 16 and router 18 which are coupled to network backbone 14. Router 18 serves as a gateway between internal network 10 and an external network 30. External network 30 can be, for example, the Internet or other public network. Firewall 16 serves to limit external access to resources in internal network 10 and protect these resources from unauthorized use. Internal network 10 further comprises a network vulnerability assessment (NVA) engine 20 coupled to network backbone 14. NVA engine 20 is coupled to and can communicate with a port database 22, a rule set 24, and a datamine database 26. NVA engine 20 can comprise, for example, software code executing on a computing device such a SUN or INTEL based workstation. Alternatively, NVA engine 20 could be integrated into a network device coupled to network backbone 14 such as router 18 or firewall 16. Port database 22, rule set 24, and datamine database 26 can comprise data stored in memory or fixed storage on the workstation or other device in which NVA engine 20 resides. Alternately, some or all of port database 22, rule set 24, and datamine database 26 could reside in fixed storage remote from the location of NVA engine 20.

In the embodiment of FIG. 1, external network 30 can include a second router 32. A second NVA engine 40 can be coupled to external network 30 via network connection 34. NVA engine 40 is coupled to and communicates with a second port database 42, a second rule set 44, and a second datamine database 46. As shown, an NVA engine can be placed inside internal network 10, like NVA engine 20, or external to network 10, like NVA engine 40. The different placement of NVA engines allows for access to different devices in internal network 10 and thus the NVA engines can make different assessments of internal network 10.

In operation, devices such as workstations 12 can communicate over network backbone 14. Workstations 12 can further communicate with external network 30 via network backbone 14 and router 18. As mentioned above, firewall 16 is intended to prevent unauthorized access from external network 30 to devices coupled to internal network 10. However, firewall 16 is not capable of preventing all unauthorized access.

According to the present invention, NVA engine 20 is operable to perform network vulnerability assessment. In general, this assessment is "multi-phase" in that it can be carried out in multiple steps or phases. Furthermore, the assessment is "rules driven" in that network configuration information can be processed by rule sets to assess vulnerabilities. An initial phase of the assessment can be a discovery phase. NVA engine 20 is operable to ping devices coupled to network backbone 14 in order to identify all such devices or systems that are so coupled. Such an operation can be called "host discovery."

Another phase of the assessment can be a data collection phase. NVA engine 20 can, for example, perform port scans on each device coupled to network backbone 14. NVA engine 20 can further receive banners from the scanned ports. For example, NVA engine 20 could open a connection to a port on workstation 12 and receive a telnet banner from that port of workstation 12. NVA engine 20 can use such banner information to create and to maintain port database 22. For example, in internal network 10, port database 22 can include entries for each port that is available through router 18, firewall 16, and each of workstations 12. NVA engine 20 can continue the data collection phase by performing host nudges and/or active exploits on devices coupled to network backbone 14 in order to ascertain configuration data of each device and port. A host nudge is generally a non-invasive command that can be used to create the equivalent of a port banner. Examples of host nudges can be "showmount -e", "rpcinfo", or "GET /" (on HTTP port). An example of an active exploit could comprise, for example, executing commands against a known service or sending data to an active port. Once established, port database 22 can comprise, for example, a snapshot of network 10 at a given point in time.

NVA engine 20 can then execute an analysis phase of the assessment by applying rule set 24 to port database 22 and creating datamine database 26. The operation of the analysis phase can comprise, for example, the methodology shown in and described with respect to FIGS. 3B and 4. After this process, datamine database 26 can include potential vulnerabilities identified by NVA engine 20. Additionally, datamine database 26 can comprise a multi-dimensional database that includes dimensions based upon the dimensionality of the internal network 10. NVA engine 20 can further perform active exploits on internal network 10 in order to confirm the potential vulnerabilities identified in datamine database 26.

NVA engine 40 is operable to perform a similar vulnerability assessment function as NVA engine 20. However, NVA engine 40 is placed outside of internal network 10 and is external to router 18 and firewall 16. Such a placement can prevent NVA engine 40 from identifying potential vulnerabilities of internal network 10 because firewall 16 may prevent NVA engine 40 from gaining access to network 10. However, this placement gives NVA engine 40 a better view of devices on external network 30. Additionally, NVA engine 40 may be able to make a vulnerability assessment of router 18, wherein NVA engine 20 may be prevented from doing so because of firewall 16.

In implementation, NVA engines 20 and 40 can comprise executable software code residing on a computing platform. For example, NVA engines 20 and 40 could comprise executable code running on a PENTIUM PRO or SUN SPARC platform with a SOLARIS X86 V2.5x or V2.6 operating system. Rule set 24 can be implemented as a text based (e.g., ASCII) language based upon prepositional logic. Such an implementation of rule set 24 has a technical advantage in that as new assessment capabilities are introduced, new rule sets 24 can be added to the system without the need to develop new software code for NVA engines 20 and 40. Such an implementation can also allow for efficient debugging of rule set 24, as it is human readable.

Figure 2:
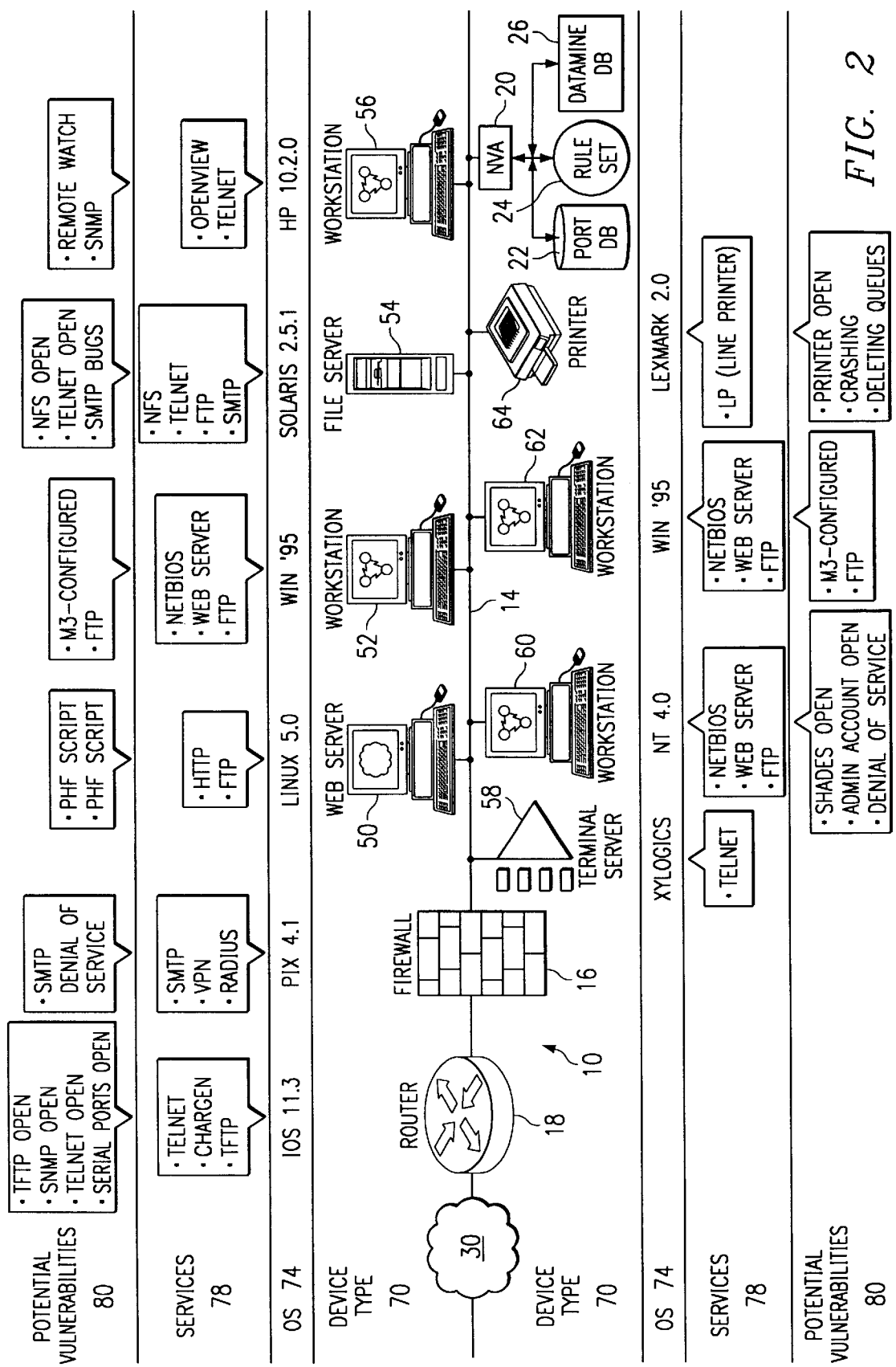
FIG. 2 is a block diagram that includes configuration data of one embodiment of a network that includes a system for network vulnerability assessment according to the present invention.

FIG. 2 is a block diagram that includes configuration data of one embodiment of a network that includes a system for network vulnerability assessment according to the present invention. This diagram also shows the dimensionality of the network and its devices in terms of: device types, operating systems, services, and potential vulnerabilities. Internal network 10 of FIG. 2 comprises numerous devices including router 18, firewall 16, web server 50, workstations 52, 56, 60, and 62, file server 54, printer 64, and terminal server 58. Each of these devices is coupled to network backbone 14. Similar to FIG. 1, NVA engine 20 is coupled to network backbone 14 and is coupled to and in communication with port database 22, rule set 24, and datamine database 26.

In operation, NVA engine 20 is operable to perform a network vulnerability assessment of internal network 10. The assessment can include, as discussed with respect to FIG. 1, a discovery phase and data collection phase. By executing such processes, NVA engine 20 can identify the configuration of internal network 10 and uncover the various dimensions within internal network 10. For example, in the embodiment of FIG. 2, NVA engine 20 can identify the device type 70 of each device or system coupled to internal network 10. NVA engine 20 can further identify the operating system 74 of each device and the services 78 available on each device. Such data can be incorporated into port database 22, for example, as entries populating fields of port database 22.

The potential vulnerabilities 80 can also be identified by NVA engine 20. For example, the potential vulnerabilities 80 shown in the embodiment of FIG. 2 can be the potential vulnerabilities inherent to the services 78 and operating system 74 of each device 70. In order to identify a particular potential vulnerability 80 on a particular device 70, NVA engine 20 can apply rule set 24 to port database 22. As discussed with respect to FIG. 1, such a process can be an analysis phase of the network vulnerability assessment. This assumes, of course, that router 18 and firewall 16 allow access to telnet service 78 from external network 30. After application of the rule set 24, NVA engine 20 can create datamine database 26 from the resulting data, and datamine database 26 can include potential vulnerabilities in internal network 10. NVA engine 20 can further perform active exploits on network 10 to confirm the identified potential vulnerabilities.

Figure 3A:
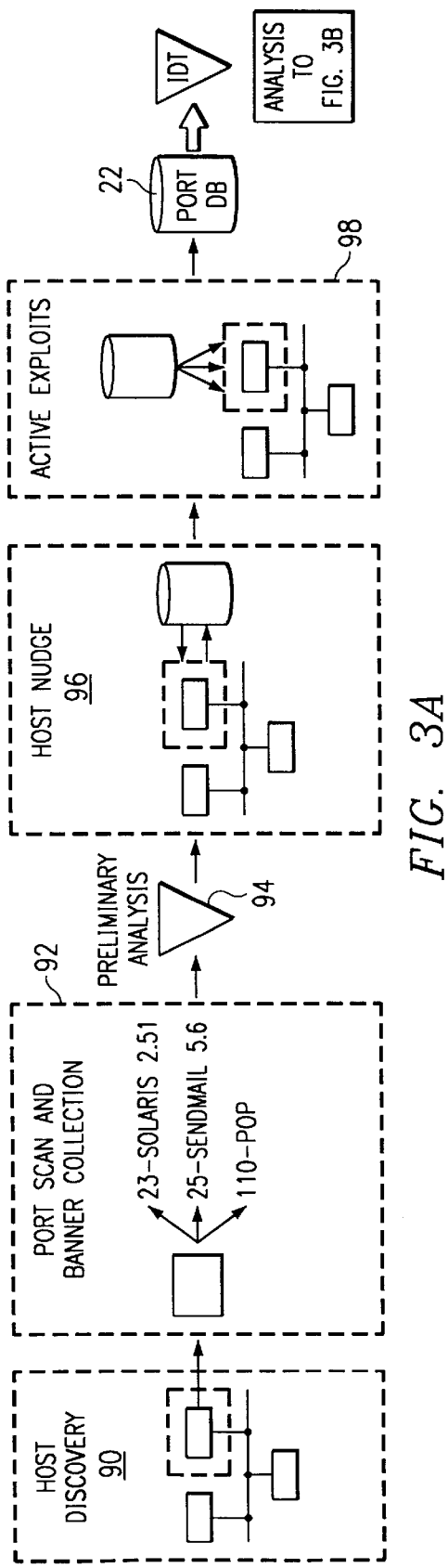
FIGS. 3A and 3B are flow diagrams of one embodiment of a method for network vulnerability assessment according to the present invention.
Figure 3B:
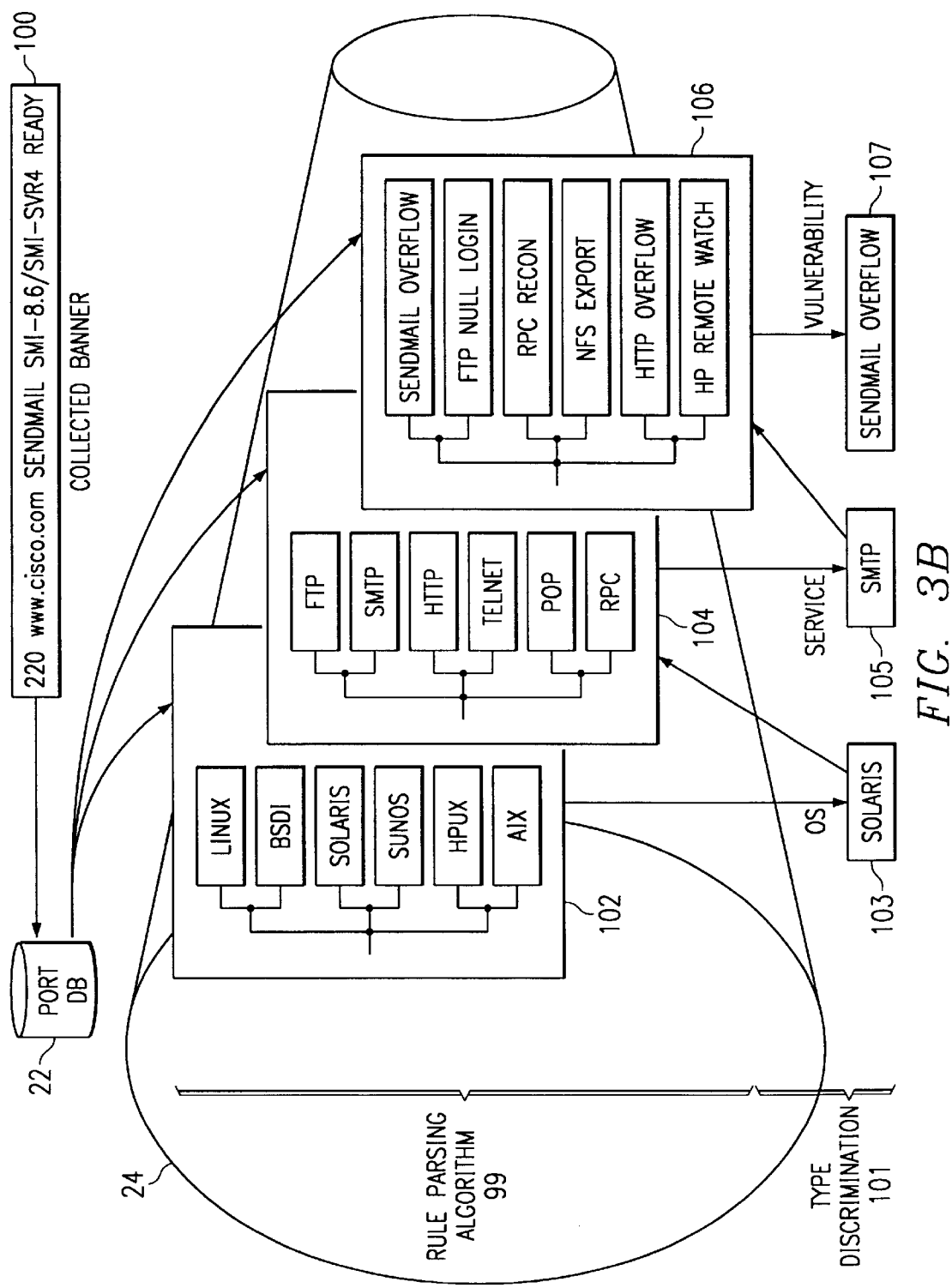

FIGS. 3A and 3B are flow diagrams of one embodiment of a method for network vulnerability assessment according to the present invention. Such a method can be executed, for example, by NVA engine 20 of FIG. 2. At step 90, host discovery is performed. Host discovery can include, for example, pinging devices on a network in order to determine devices which are coupled to the network. At step 92, passive data collection is performed. For example, this can include collecting sign-on banners from active ports on a device. An example of a sign-on banner can be, for example, a telnet barrier at a TCP port. Further examples of sign-on banners collected during this step, as shown in FIG. 3A, are a Sendmail 5.6 banner collected from port 25 and a POP banner collected from port 110. This data collection activity can be "read only" activity and does not require interaction with an entity beyond opening a port. In this manner, it is "passive."

Next at step 94, a preliminary analysis is performed. This analysis can include determining that a host nudge step 96 and/or an active exploit step 98 are necessary. For example, at step 94, it can be determined if each host discovered in step 90 responded to the port scan of step 92. At step 96, a host nudge is performed, and at step 98, active exploits are performed. A host nudge can comprise, for example, "showmount -e", "rpcinfo", or "GET /1" (on HTTP port). An example of an active exploit could comprise, for example, executing commands against a known service or sending data to an active port. Host nudge step 96 and active exploits step 98 are performed to further identify the complete configuration of the network upon which the vulnerability analysis is performed.

The information produced by steps 90, 92, 96, and 98 are then stored in a port database 22, for example, as entities in database fields. Port database 22 can thus provide a snapshot of the network at a given point in time.

In the embodiment of FIG. 3A, the host discovery at step 90 can be considered the discovery phase of the network vulnerability assessment. Steps 92, 94, 96 and 98 can collectively be considered the data collection phase. After the creation of port database 22, an analysis phase can be performed, one embodiment of which is shown in FIG. 3B.

FIG. 3B is a flow diagram of one embodiment of an analysis phase of the method for network vulnerability assessment according to the present invention. In the embodiment of FIG. 3B, port database 22 includes entries that comprise information collected in previous phases of the assessment. For example, entry 100 of port database 22 can include information from a collected banner. Rule set 24 can then be used to process port database 22. Rule set 24 can include rule parsing algorithm 99, operating system rules 102, service rules 104, and vulnerability rules 106. Rule set 24 can support incremental discrimination of type such that as rule parsing algorithm 99 is applied, for example, to entry 100 of port database 22, type discriminations 101 can be determined. Rule set 24 can include, for example, a discriminator language based on prepositional logic that conforms to a Baccus Noir Form.

In operation, rule set 24 can be applied to each entry 100, and rule parsing algorithm 99 can be used to determine type discriminations 101 from entry 100. In the embodiment of FIG. 3B, three type discriminations 101 are derived from the example entry 100: operating system type, service type, and vulnerability type. First, rule set 24 can apply operating system rules 102 to entry 100. In the example of FIG. 3B, the discriminated operating system type 103 is SOLARIS. Rule parsing algorithm 99 can then take the operating system type 103 and further apply service rules 104 to entry 100 to determine the service type 105. In the example of FIG. 3B, rule parsing algorithm 99 can determine that with a SOLARIS operating system and information from entry 100, the service type 105 is SMTP. Rule parsing algorithm 99 can next be used with vulnerabilities rules 106 to determine that, with a SOLARIS operating system, an SMTP service, and information from entry 100, one potential vulnerability 107 is Sendmail Overflow.

The embodiment of the analysis phase shown in FIG. 3B highlights a hierarchical nature of rule set 24. Such an implementation provides a technical advantage in that it allows for rapid incremental discrimination of type of large amounts of data. Therefore, a device implementing the present methodology using such a rule set can quickly and efficiently assess the vulnerabilities of a network.

FIG. 4 is a flow diagram of a portion of one embodiment of a prepositional logic rule set used in network vulnerability assessment according to the present invention. As discussed above, port database 22 can include entries 100 which include configuration information such as banners received in the host discovery phase. In the embodiment of FIG. 4, rule set 24 comprises prepositional logic elements 111, 115, and 119. Type discriminations 101, as discussed above, can then be determined from the application of rule set 24 to entries 100 in port database 22.

In operation, entry 100 in port database 22 can initially include banner 110. Prepositional logic element 111 can be applied to entry 110 to determine a type discrimination 101 of "SOLARIS 2.x" operating system. Similarly, the elements 115 and 119 of rule set 24 of FIG. 4 can further be applied to entries 114 and 118 to determine the type discrimination 49 of "FTP active" service and a "Sendmail Overflow" potential vulnerability.

As shown in FIG. 4, rule set 24 can be expressed in an ASCII based prepositional logic language. In operation, NVA engine 20 can apply a given rule set 24 to port database 22. If desired, rule set 24 can be exchanged with a new rule set. It is an advantage that such an exchange can be implemented without additional compilation of the NVA engine or other executable portion of the system. Further, rule set 24 can be extended to add custom rules needed by a particular network operator.

FIG. 5 is a block diagram of one embodiment of an analysis phase of a method for network vulnerability assessment according to the present invention. In the embodiment of FIG. 5, multiple rule sets 24 and 124 are applied to port database 22 to generate two datamine databases 26 and 126. For example, port database 22 can represent a snapshot of a network at a given point in time. Rule set 24 can be applied to port database 22, and datamine database 26 can be created. Datamine database 26 can then include potential vulnerabilities of the network as represented by port database 22 and as analyzed using rule set 24. The assessment, however, is somewhat dependent upon rule set 24. If new, previously unknown potential vulnerabilities are discovered or if corrections to rule set 24 are needed, then a new rule set 124 can be created. This second rule set 124 can be applied to the same port database 22 to create a second datamine database 126 including a new representation of network vulnerabilities. It is a technical advantage of the present invention that a snapshot of a network at a given point in time can be stored by port database 22 and that different vulnerability assessments can be performed on that snapshot using different rule sets. This advantage leads to more efficient debugging of rule sets as well as to more adaptive vulnerability assessment.

Although described in terms of discrete "phases", those skilled in the art will recognize that the method and system of network vulnerability assessment of the present invention can also comprise an iterative process. For example, during the analysis phase it can be determined that blocks of configuration data in the port database are missing, and thus the system can return to the discovery phase to perform some further data gathering. Additionally, the present invention can streamline the network vulnerability assessment by recognizing common network configurations. For example, most detection (i.e., discovery of the OS and service of each device) can be performed by gathering information, for example by a regex, from ports 21, 23, and 25 on a device. Much of the remaining needed information can be gathered with a PERL regex to capture version information. There are, however, instances of specific configurations that can require specific knowledge in order to determine the configuration. For example, SGI can run IRIX operating system. Therefore, if SGI responds at port 25 on a device, the operating system could be IRIX. However, SGI may support other operating systems, so the determination of an IRIX operating system should only be made as a default—if no other operating system can be determined. Such a specific hierarchy of analysis can be performed by the rule set driven analysis, as discussed with respect to FIGS. 3A, 3B, 4, and 5.

Another embodiment of the present invention can include an active analysis phase for the purpose of confirming the potential vulnerabilities identified by the network vulnerability assessment. Such a phase can comprise active exploits performed on the network against particular devices, services, or ports. Such an activity can be performed in real-time and thus it may be necessary to include a real-time data feed function into the datamine database. For example, such real time data insertion is described in U.S. patent application Ser. No. 09/107,790, entitled "System and Method for Real-Time Insertion of Data Into a Multi-Dimensional Database for Network Intrusion Detection and Vulnerability Assessment", pending, the disclosure of which is incorporated herein by reference.

Although the present invention has been described in detail, it should be understood that various changes, substitutions and alterations can be made thereto without departing from the spirit and scope of the invention as defined by the appended claims.

What is claimed is:

1. A computer implemented method for multi-phase rules-driven network vulnerability assessment, the method comprising:

pinging devices on a network to discover devices with a connection to the network;

performing port scans on the discovered devices and collecting banners sent as a result of the port scans;

storing information from the collected banners as entries in a first database to establish a network configuration;

comparing the entries in the network configuration with more than one rule set to determine potential vulnerabilities; and storing results of the comparison in a second database.

2. The method of claim 1, further comprising performing host nudges on the devices and storing information from data received as entries in the first database.

3. The method of claim 1, further comprising performing active data collection and storing information from data received as entries in the first database.

4. The method of claim 1, wherein comparing comprises:

comparing an entry in the network configuration to a rule to determine an operating system represented by the entry;

comparing the entry to a second rule to determine a service; and comparing the entry to a third rule to determine a potential vulnerability.

5. The method of claim 1, wherein the rule sets comprise a text based prepositional logic language.

6. The method of claim 1, further comprising confirming a potential vulnerability by performing an active exploit.

7. A system for multi-phase rules-driven network vulnerability assessment, the system comprising:

a first database for storing information from collected banners as entries;

a plurality of rule sets;

a second database for storing results of a comparison; and an execution module coupled to the first database, the rule set, and the second database, the execution module operable to ping devices on a network to discover devices with a connection to the network, the execution module further operable to perform port scans on the discovered device and collect banners sent as a result of the port scans;

the execution module operable to store information from the collected entries in the first database to establish a network configuration and compare the entries in the network configuration with more than one rule set to determine potential vulnerabilities;

the execution module operable to store results of the comparision in the second database.

8. The system of claim 7, wherein the execution module is further operable to perform host nudges on the devices and store information from data received as entries in the first database.

9. The system of claim 7, wherein the execution module is further operable to perform active data collection and store information from data received as entries in the first database.

10. The system of claim 7, wherein the execution module is operable to:
compare an entry in the network configuration to a rule to determine an operating system represented by the entry;
compare the entry to a second rule to determine a service; and
compare the entry to a third rule to determine a potential vulnerability.

11. The system of claim 7, wherein the rule sets comprise a text based prepositional logic language.

12. The system or claim 7, wherein the execution module is further operable to confirm a potential vulnerability by performing an active exploit.

13. A computer implemented method for multiphase rules-driven network vulnerability assessment, the method comprising:
pinging devices on a network to discover devices with a connection to the network;
performing port scans on the discovered devices and collecting banners sent as a result of the port scans;
storing information from the collected banners as entries in a first database to establish a network configuration;
comparing an entry in the first database to a rule to determine an operating system represented by the entry;
comparing the entry to a second rule to determine a service;
comparing the entry to a third rule to determine a potential vulnerability; and
storing results of the comparing steps in a second database.

14. The method of claim 13, further comprising performing host nudges on the devices and storing information from data received as entries in the first database.

15. The method of claim 13, further comprising performing active data collection and storing information from data received as entries in the first database.

16. The method of claim 13, wherein the rules comprise an ASCII based prepositional logic language.

17. The method of claim 13, further comprising confirming a potential vulnerability by performing an active exploit.

18. Logic encoded in media for multi-phase rules-driven network vulnerability assessment and operable to perform the following steps:

pinging devices on a network to discover devices with a connection to the network;

performing port scans on the discovered devices and collecting banners sent as a result of the port scans;

storing information from the collected banners as entries in a first database to establish a network configuration;

comparing the entries in the network configuration with more than one rule set to detemine potential vulnerabilities; and storing results of the comparison in a second database.

19. The logic of claim 18, further comprising the step of performing host nudges on the devices and storing information from data received as entries in the first database.

20. The logic of claim 18, further comprising the step of performing active data collection and storing information from data received as entries in the first database.

21. The logic of claim 18, wherein comparing comprises:
comparing an entry in the network configuration to a rule to determine an operating system represented by the entry;
comparing the entry to a second rule to determine a service; and
comparing the entry to a third rule to determine a potential vulnerability.

22. The logic of claim 18, further comprising the step of confirming a potential vulnerability by performing an active exploit.

23. An apparatus for multi-phase rules-driven network vulnerability assessment comprising:
means for pinging devices on a network to discover devices with a connection to the network;
means for performing port scans on the discovered devices and collecting banners sent as a result of the port scans;
means for storing information from the collected banners as entries in a first database to establish a network configuration;
means for comparing the entries in the network configuration with more than one rule set to determine potential vulnerabilities; and
means for storing results of the comparison in a second database.

24. The apparatus of claim 23, further comprising means for performing host nudges on the devices and storing information from data received as entries in the first database.

25. The apparatus of claim 23, further comprising means for performing active data collection and storing information from data received as entries in the first database.

26. The apparatus of claim 23, wherein means for comparing comprises:
means for comparing an entry in the network configuration to a rule to determine an operating system represented by the entry;
means for comparing the entry to a second rule to determine a service; and
means for comparing the entry to a third rule to determine a potential vulnerability.

27. The apparatus of claim 23, further comprising means for confirming a potential vulnerability by performing an active exploit.

* * * * *